United States Patent
Johnson (10) Patent No.: US 11,040,782 B1
(45) Date of Patent: Jun. 22, 2021

(54) ADJUSTABLE LEVELING DRONE PLATFORM

(71) Applicant: William Michael Johnson, Montgomery, NY (US)

(72) Inventor: William Michael Johnson, Montgomery, NY (US)

(*) Notice: Subject to any disclaimer, the term of this patent is extended or adjusted under 35 U.S.C. 154(b) by 0 days.

(21) Appl. No.: 16/359,147

(22) Filed: Mar. 20, 2019

Related U.S. Application Data (60) Provisional application No. 62/645,956, filed on Mar. 21, 2018.

(51) Int. Cl.
*F16M 11/24* (2006.01)
*B64F 1/00* (2006.01)
*F16M 7/00* (2006.01)

(52) U.S. Cl.
CPC ............... *B64F 1/00* (2013.01); *F16M 7/00* (2013.01); *F16M 11/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 875,034 A * | 12/1907 | Wright | ........... | F16M 11/14 248/181.1 |
| 3,356,325 A * | 12/1967 | Schnase | ........... | F16M 11/2021 248/187.1 |
| 3,632,073 A * | 1/1972 | Nakatani | ........... | F16M 11/242 248/169 |
| 4,016,583 A * | 4/1977 | Yeates | ........... | F16M 11/14 396/420 |
| 4,317,552 A * | 3/1982 | Weidler | ........... | F16M 11/16 211/203 |
| 4,570,887 A * | 2/1986 | Banister | ........... | F16M 11/041 248/187.1 |
| 5,259,584 A * | 11/1993 | Wainwright | ........... | F16M 11/08 248/289.11 |
| 5,522,514 A * | 6/1996 | Robinson | ........... | A47B 37/04 108/151 |
| 6,487,807 B1 * | 12/2002 | Kopman | ........... | F41A 23/12 42/72 |
| 6,572,061 B2 * | 6/2003 | Overbeck | ........... | A47C 4/20 248/163.1 |
| 6,688,239 B1 * | 2/2004 | Pettini | ........... | A47B 7/02 108/50.11 |
| 6,837,386 B1 * | 1/2005 | Kent | ........... | A47B 96/027 108/151 |
| 6,991,384 B1 * | 1/2006 | Davis | ........... | F16M 11/041 248/187.1 |
| 7,410,125 B2 * | 8/2008 | Steele | ........... | B64F 1/029 244/110 E |

(Continued)

*Primary Examiner* — Monica E Millner
(74) *Attorney, Agent, or Firm* — Saile Ackerman LLC; Stephen B. Ackerman; Rosemary L. S. Pike (57) ABSTRACT

A portable platform device is described comprising a central body and a plurality of legs located on the central body near a distal end of the central body and spaced radially around the central body wherein the legs are configured for placement on a surface. A ball joint is mounted at its distil end to a proximal end of the central body and a platform is configured to be fixed to a proximal end of the ball joint and configured to be adjustable to a horizontally level and vertically plumb position.

9 Claims, 6 Drawing Sheets

(56) References Cited

U.S. PATENT DOCUMENTS

| | | | | |
|---|---|---|---|---|
| 7,631,842 B2* | 12/2009 | Crain | ............... | F16B 7/1463 |
| | | | | 248/165 |
| 8,162,256 B2* | 4/2012 | Goossen | ............... | B64C 39/024 |
| | | | | 244/110 E |
| 8,197,149 B2* | 6/2012 | Darrow | ............... | F16M 11/041 |
| | | | | 248/168 |
| 8,267,361 B1* | 9/2012 | Dordick | ............... | F16M 11/14 |
| | | | | 248/178.1 |
| 8,276,524 B2* | 10/2012 | Goode | ............... | A47G 19/00 |
| | | | | 108/101 |
| 8,590,377 B2 | 11/2013 | Post et al. | | |
| 8,720,349 B1* | 5/2014 | David | ............... | A47B 37/04 |
| | | | | 108/151 |
| 8,827,219 B2* | 9/2014 | Kessler | ............... | F16M 11/048 |
| | | | | 248/187.1 |
| 8,955,801 B2* | 2/2015 | McGeer | ............... | B64F 1/125 |
| | | | | 244/110 F |
| 9,163,774 B2* | 10/2015 | Orlov | ............... | F16M 7/00 |
| 9,221,557 B1 | 12/2015 | Friesel | | |
| 9,285,075 B2* | 3/2016 | Moody | ............... | F41C 23/16 |
| 9,387,928 B1 | 7/2016 | Gentry et al. | | |
| 9,387,940 B2 | 7/2016 | Godzdanker et al. | | |
| 9,505,493 B2 | 11/2016 | Borko | | |
| 9,561,871 B2 | 2/2017 | Sugumaran | | |
| 9,650,152 B2 | 5/2017 | Claudel et al. | | |
| 9,696,340 B2 | 7/2017 | Trusov et al. | | |
| 10,131,451 B2* | 11/2018 | Salgueiro | ............... | B64D 1/00 |
| 2004/0256519 A1* | 12/2004 | Ellis | ............... | B64F 1/02 |
| | | | | 244/110 E |
| 2005/0045783 A1* | 3/2005 | Brumley | ............... | B25H 1/00 |
| | | | | 248/181.1 |
| 2006/0000957 A1* | 1/2006 | Carnevali | ............... | F16M 11/14 |
| | | | | 248/181.1 |
| 2010/0282926 A1* | 11/2010 | Shen | ............... | F16M 11/36 |
| | | | | 248/179.1 |
| 2013/0206915 A1 | 8/2013 | Desaulniers | | |
| 2014/0124621 A1* | 5/2014 | Godzdanker | ............... | B64F 1/28 |
| | | | | 244/110 E |
| 2015/0175276 A1* | 6/2015 | Koster | ............... | B64C 39/024 |
| | | | | 244/114 R |
| 2015/0183528 A1 | 7/2015 | Walsh et al. | | |
| 2016/0144982 A1* | 5/2016 | Sugumaran | ............... | B64F 1/005 |
| | | | | 244/103 R |
| 2016/0347462 A1 | 12/2016 | Clark | | |
| 2016/0370404 A1 | 12/2016 | Quadrat et al. | | |
| 2016/0376031 A1* | 12/2016 | Michalski | ............... | G08G 5/0026 |
| | | | | 701/15 |
| 2017/0050749 A1* | 2/2017 | Pilskalns | ............... | B64F 1/007 |
| 2017/0137150 A1 | 5/2017 | Conyers et al. | | |

* cited by examiner

ADJUSTABLE LEVELING DRONE PLATFORM

This application claims benefit of U.S. Provisional Patent Application No. 62/645,956, filed on Mar. 21, 2018, which is herein incorporated by reference in its entirety.

(1) TECHNICAL FIELD

The disclosure relates to a drone platform, and more particularly, to a drone platform having the capability to provide a level surface for take-off and landing on uneven terrain.

(2) BACKGROUND

Currently there are a number of solutions for launching and recovering drones. One of these solutions attempts to utilize flat surfaces such as a deck, but this solution fails to meet the needs of the market because a deck is not always level. Another solution attempts to utilize platforms, but this solution is similarly unable to meet the needs of the market because the platforms lack adjustability and need to be on flat surfaces. Still another solution seeks to grab the drone from the air, but this solution also fails to meet market needs because this can be harmful to both the user and the drone.

SUMMARY

A primary objective of the present disclosure is to provide a launch and recovery platform for drones.

A further objective of the present disclosure is to provide a launch and recovery platform for drones that is adjustable and can be calibrated to a position of zero degrees for precise drone inertial measurement unit (IMU) calibration.

Yet another objective is to provide a launch and recovery platform for drones wherein the platform can adjust to any terrain to provide a completely level surface.

In accordance with the objectives of the present disclosure, a portable platform device is achieved comprising a central body and a plurality of legs located on the central body near a distal end of the central body and spaced radially around the central body wherein the legs are configured for placement on a surface. A ball joint assembly is mounted at its distil end to a proximal end of the central body and a platform is configured to be fixed to a proximal end of the ball joint assembly and configured to be adjustable to a horizontally level and vertically plumb position.

Also in accordance with the objectives of the present disclosure, a process for providing a launch and recovery platform for drones that is adjustable and can be calibrated to a position of zero degrees is achieved. A portable platform device is provided comprising a central body and a plurality of legs located on the central body near a distal end of the central body and spaced radially around the central body wherein the legs are configured for placement on a surface. A ball joint assembly is mounted at its distil end to a proximal end of the central body. A platform having a flat top surface and a gauge affixed to the flat top surface, the gauge configured to measure level and plumb positions, is provided. The platform is affixed to a proximal end of the ball joint assembly. The plurality of legs are locked in a fully deployed position. The platform is manipulated wherein a ball of the ball joint assembly pivots until the gauge indicates a horizontally level and vertically plumb position. Thereafter, a tightening collar of the ball joint assembly is tightened to lock the ball into place.

BRIEF DESCRIPTION OF THE DRAWINGS

In the accompanying drawings forming a material part of this description, there is shown.

DETAILED DESCRIPTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The present disclosure describes a launch and recovery drone platform with adjustable features to allow for leveling and positioning at a zero degree position for calibration of drone navigational and gyroscopic features. The platform device of the present disclosure will keep a drone and equipment clean and protect it from damage. It is ideal for landing or takeoff on rocky terrain, high grass, uneven or unstable surfaces.

Referring to the figures, FIG. 1 to FIG. 7 show a drone landing platform that is generally described as an adjustable leveling platform for a drone. The platform is adapted for placement onto a surface and includes various movable features and adjustments to allow for a completely level platform despite placement on uneven terrain. This allows for a completely level surface for take-off and landing as well as to achieve and maintain a static hovering position.

The platform device is designed to facilitate a drone's onboard inertial measurement system (IMU) calibration procedure for precision flight control. An IMU is an electronic device that measures and reports a body's specific force, angular rate, and sometimes the magnetic field surrounding the body, using a combination of accelerometers and gyroscopes, and sometimes also magnetometers. IMU's are typically used to maneuver aircraft, including unmanned aerial vehicles (UAVs). IMU systems require periodic calibration on a level surface in order to maintain optimum drone flight control characteristics. Leveling the drone platform to zero degrees provides the perfect surface for precise IMU system calibration.

Figure 1:
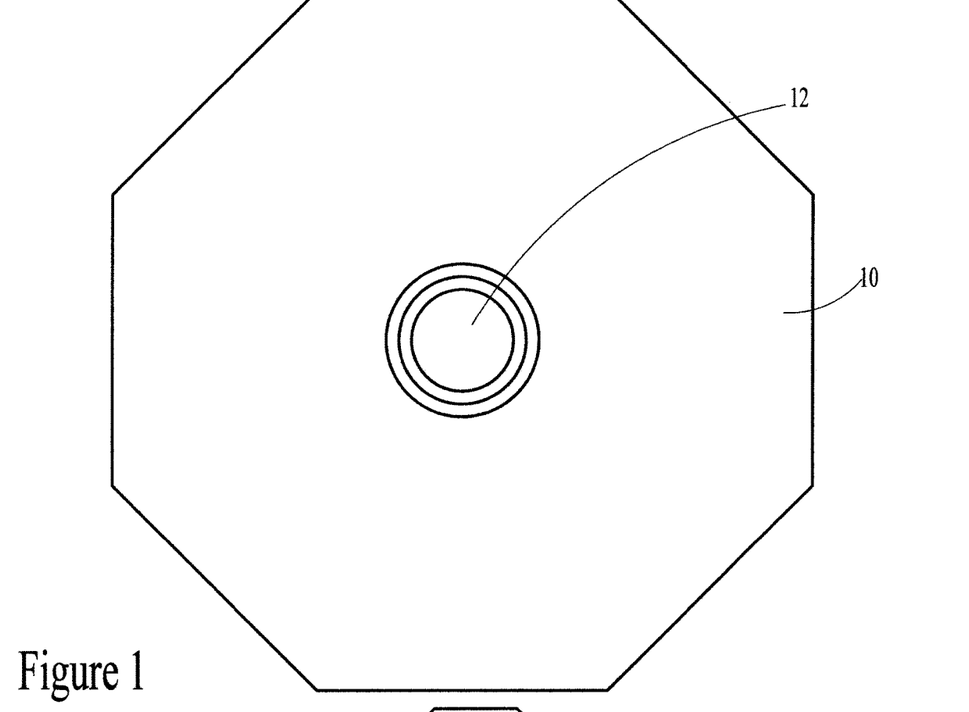
FIG. 1 illustrates a top view of a first preferred embodiment of a platform of the present disclosure.
Figure 2:
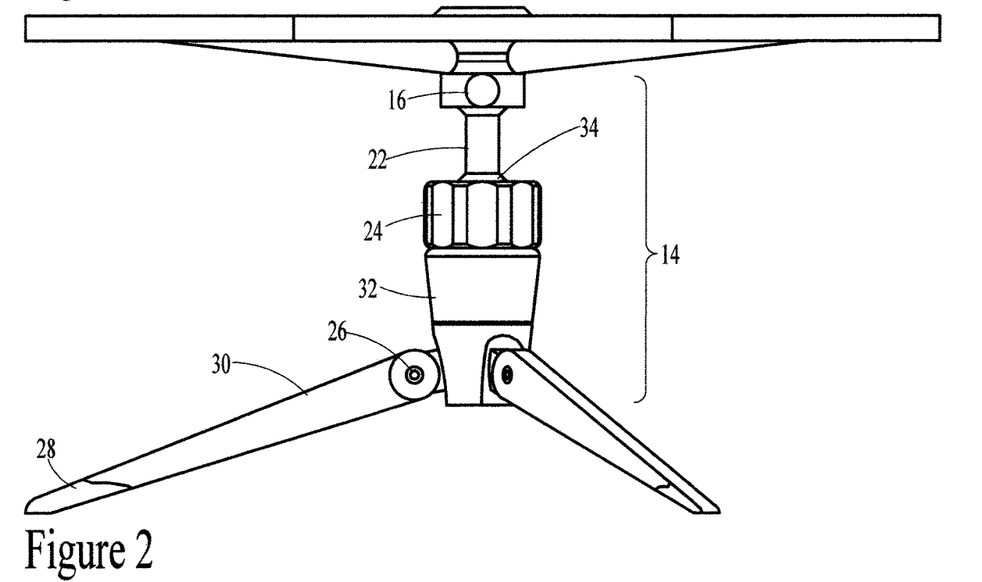
FIG. 2 illustrates a side view of the preferred embodiment of the present disclosure.
Figure 3:
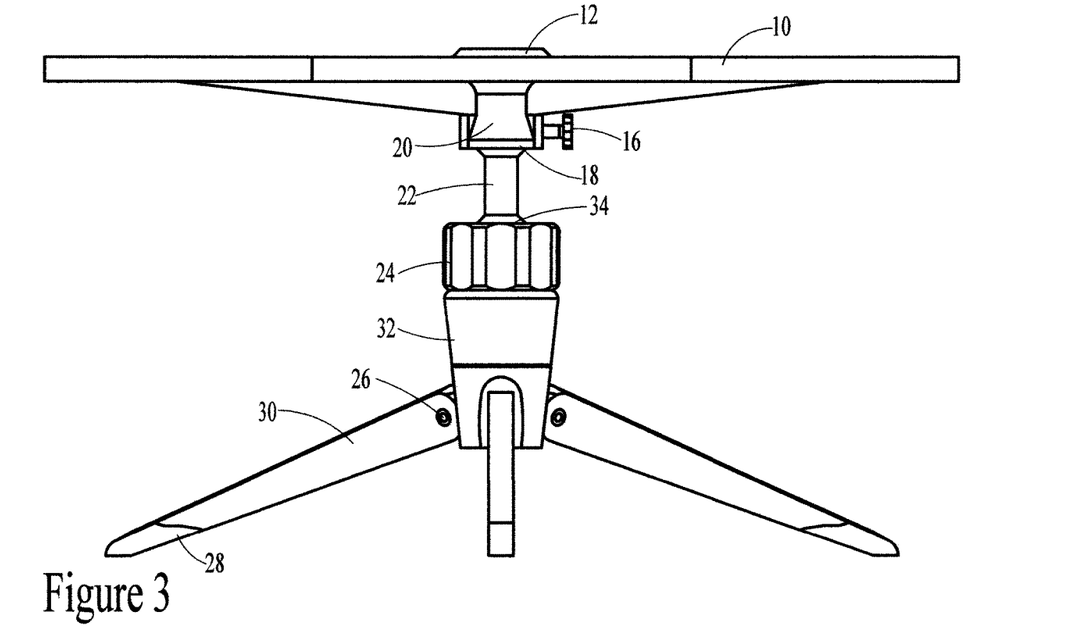
FIG. 3 illustrates a front view of the preferred embodiment of the present disclosure.
Figure 4:
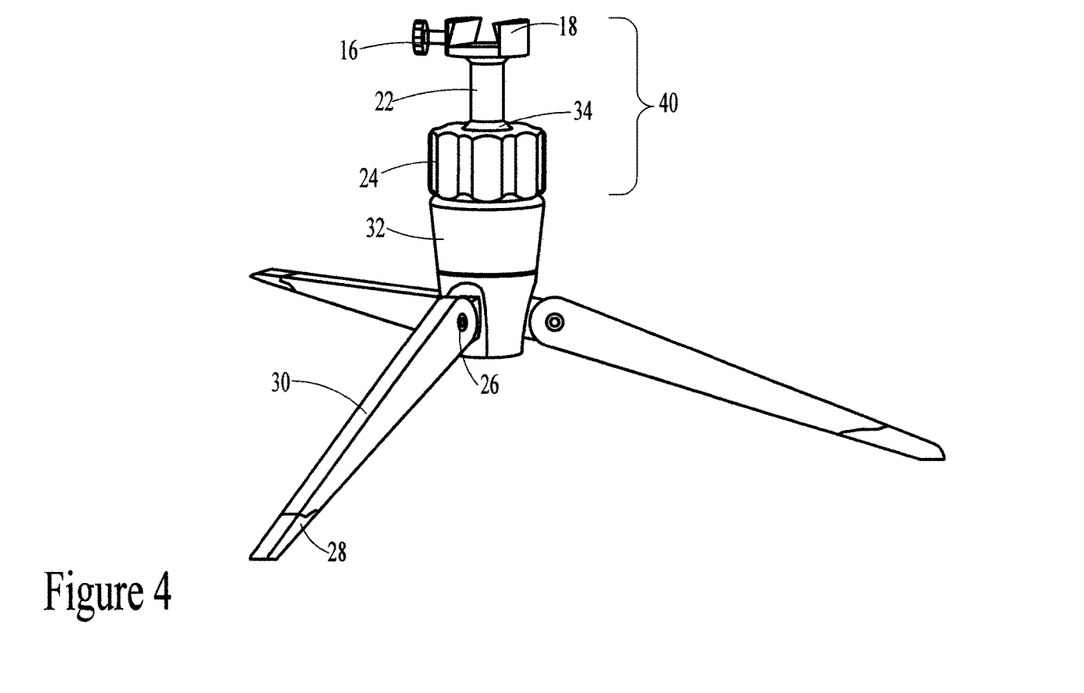
FIG. 4 illustrates a perspective view of the stand portion of the preferred embodiment of the present disclosure.
Figure 9A:
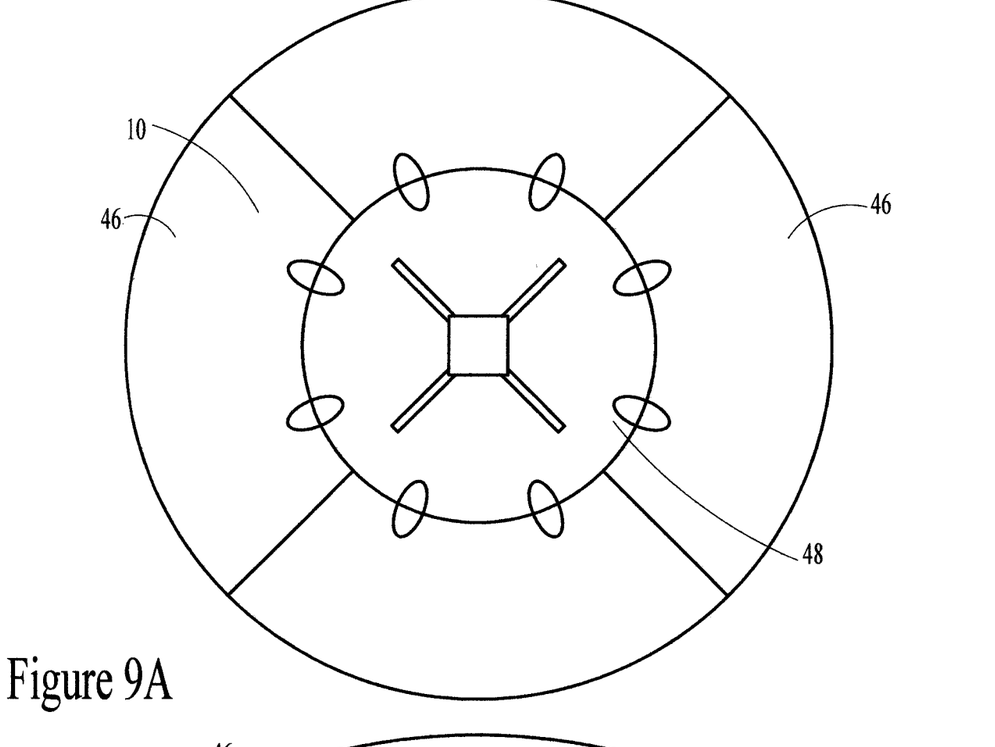
FIG. 9A-9C illustrate a base platform and extensions in a second preferred embodiment of the present disclosure.
Figure 9B:
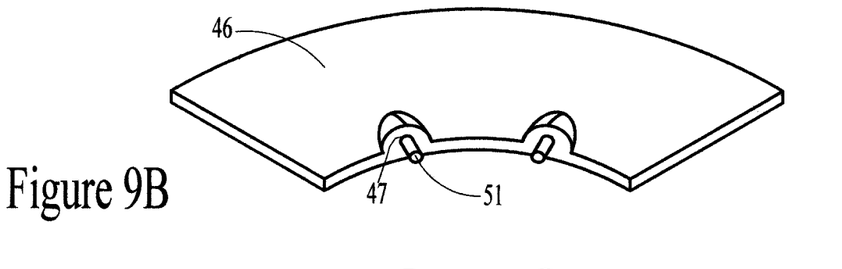
Figure 9C:
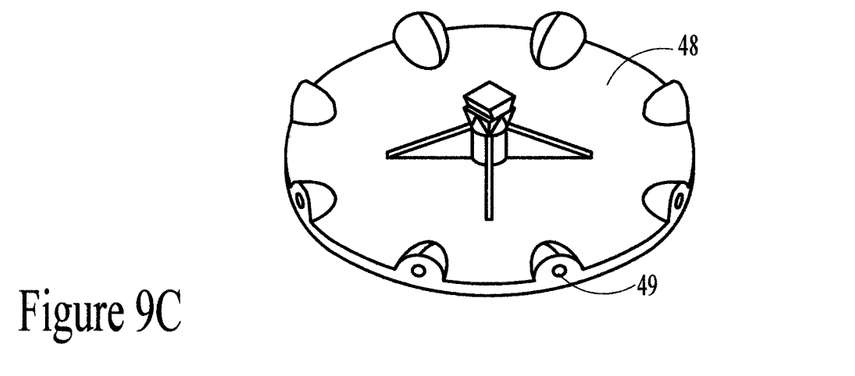

Referring now more particularly to FIG. 1, the platform 10 of the device is shown in a top view. The platform 10 can be octagonal as shown in FIG. 1, but could also be circular, as shown in FIGS. 9A-9C, or other shapes. A gauge 12 is positioned at a central position. The gauge 12 is preferably a spirit/bubble level or any other device, including an electronic device, which can be used to indicate a horizontally level position and a vertically plumb position of the platform. FIG. 2 illustrates a side view and FIG. 3 illustrates a front view of the device. The platform 10 is received on a stand 14. The stand 14 includes a platform tightening knob 16. Connection slot 18, such as a dovetail connection, is shown in FIG. 4 for receiving a corresponding connecting portion 20, such as a dovetail, on a lower portion of the platform, as seen in FIG. 3. Once the dovetail portion 20 is placed into the dovetail slot 18, the tightening knob 16 is turned to hold it in place with a threaded screw which applies horizontal pressure to dovetail portion 20.

Figure 6:
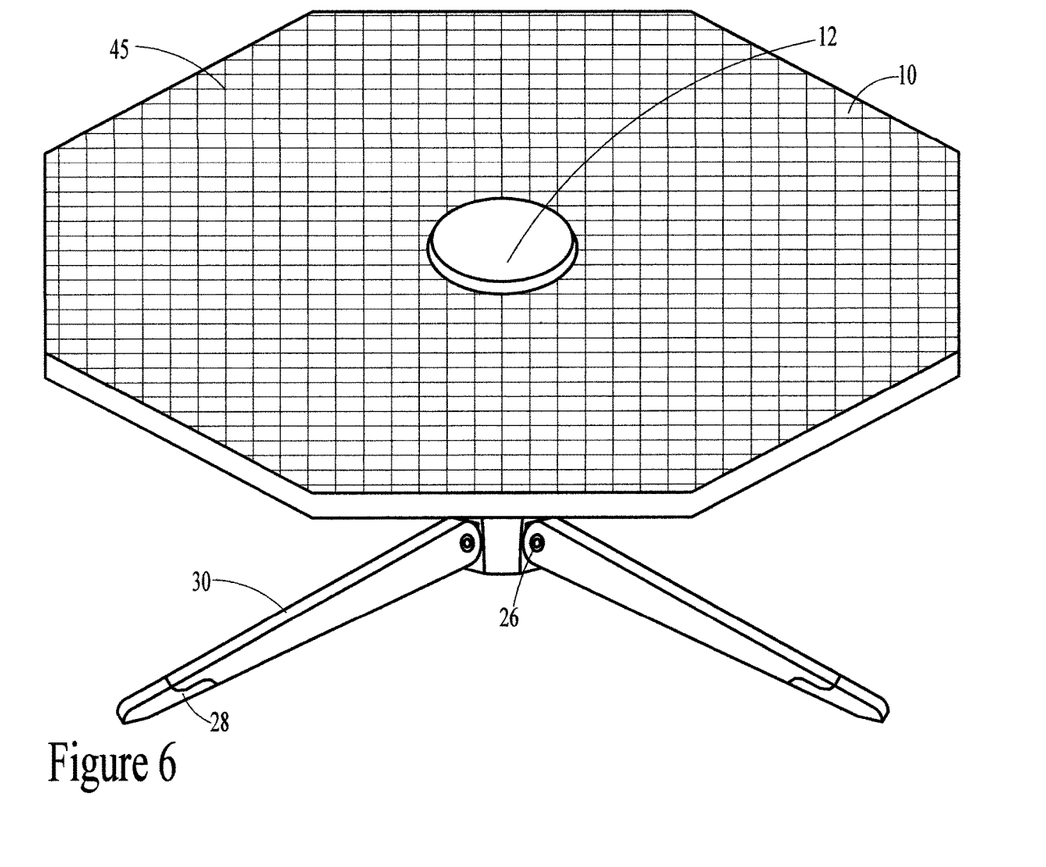
FIG. 6 illustrates a perspective view of the two parts together of the preferred embodiment of the present disclosure.
Figure 7:
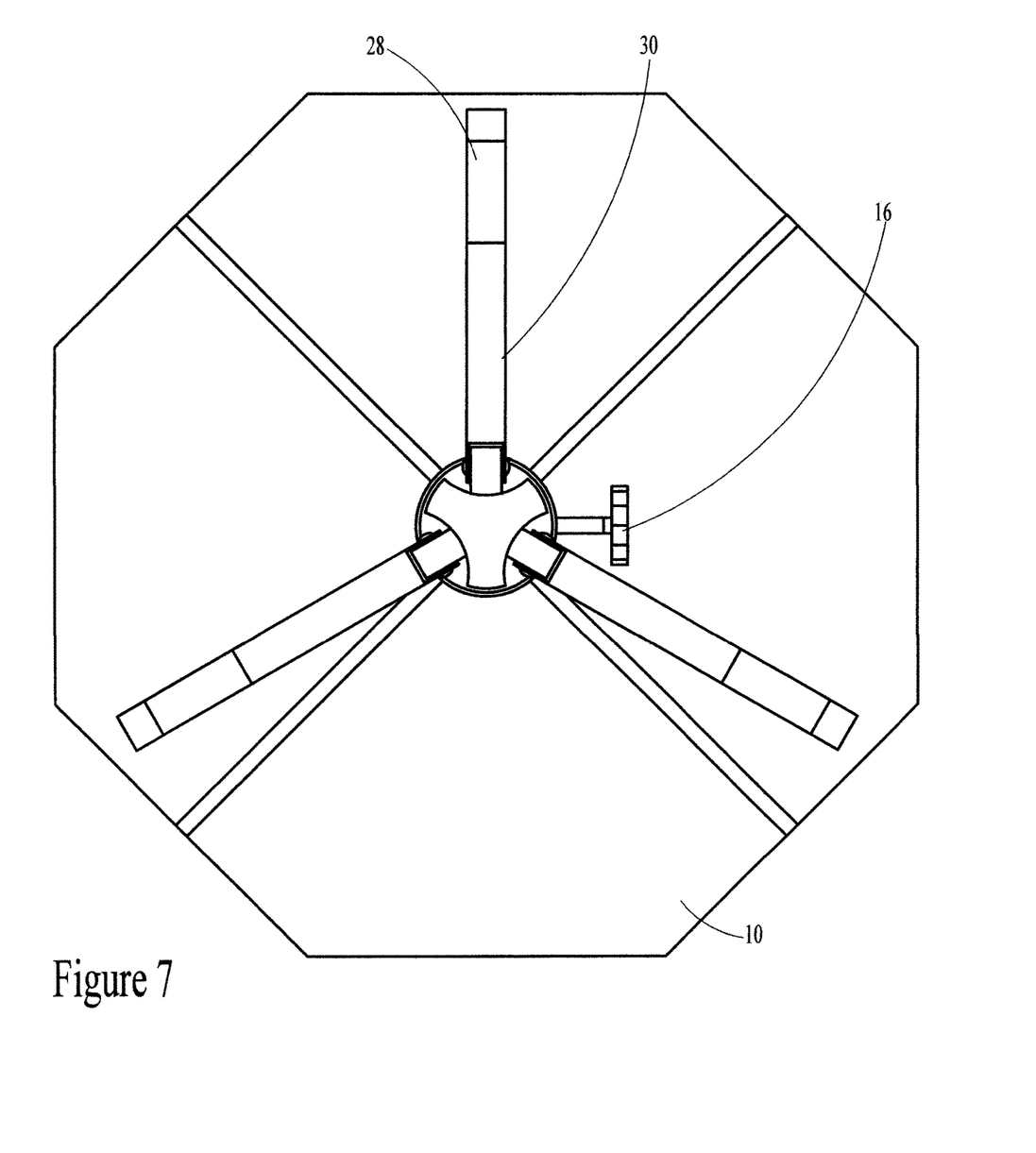
FIG. 7 illustrates a bottom view of the preferred embodiment of the present disclosure.

As shown most clearly in FIG. 4, the stand comprises a ball joint assembly 40 connected to central body 32. The ball joint assembly 40 includes the dovetail saddle 18 at the top of shaft 22, ball 34, and tightening collar 24. FIG. 6 illustrates the platform device in perspective view and FIG. 7 illustrates a view of the device from the bottom.

Figure 5:
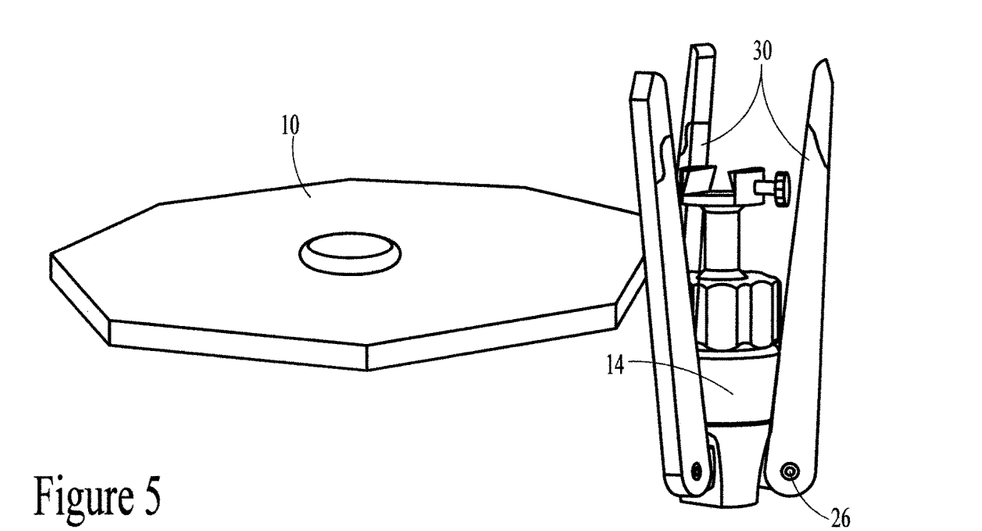
FIG. 5 illustrates a perspective view of the separated two parts of the preferred embodiment of the present disclosure.

Legs 30 having rubber feet 28 for grip and turning hinges 26 are shown. At least three legs equally spaced radially around the central body 32 are preferred for stability. Four or more legs could be provided to give additional stability and to accommodate heavier loads. The device is collapsible for storage and transportation. As shown in FIG. 5, the platform 10 is removable from the stand 14. The legs 30 pivot at the turning hinges 26 so that the legs fold adjacent to the shaft portion of the stand in a compact form. The turning hinges have two lockable positions via a slotted groove and spring retaining pin. These positions are: (1) the stowed position shown in FIG. 5 and (2) the fully deployed position shown in FIG. 6, for example.

Figure 8:
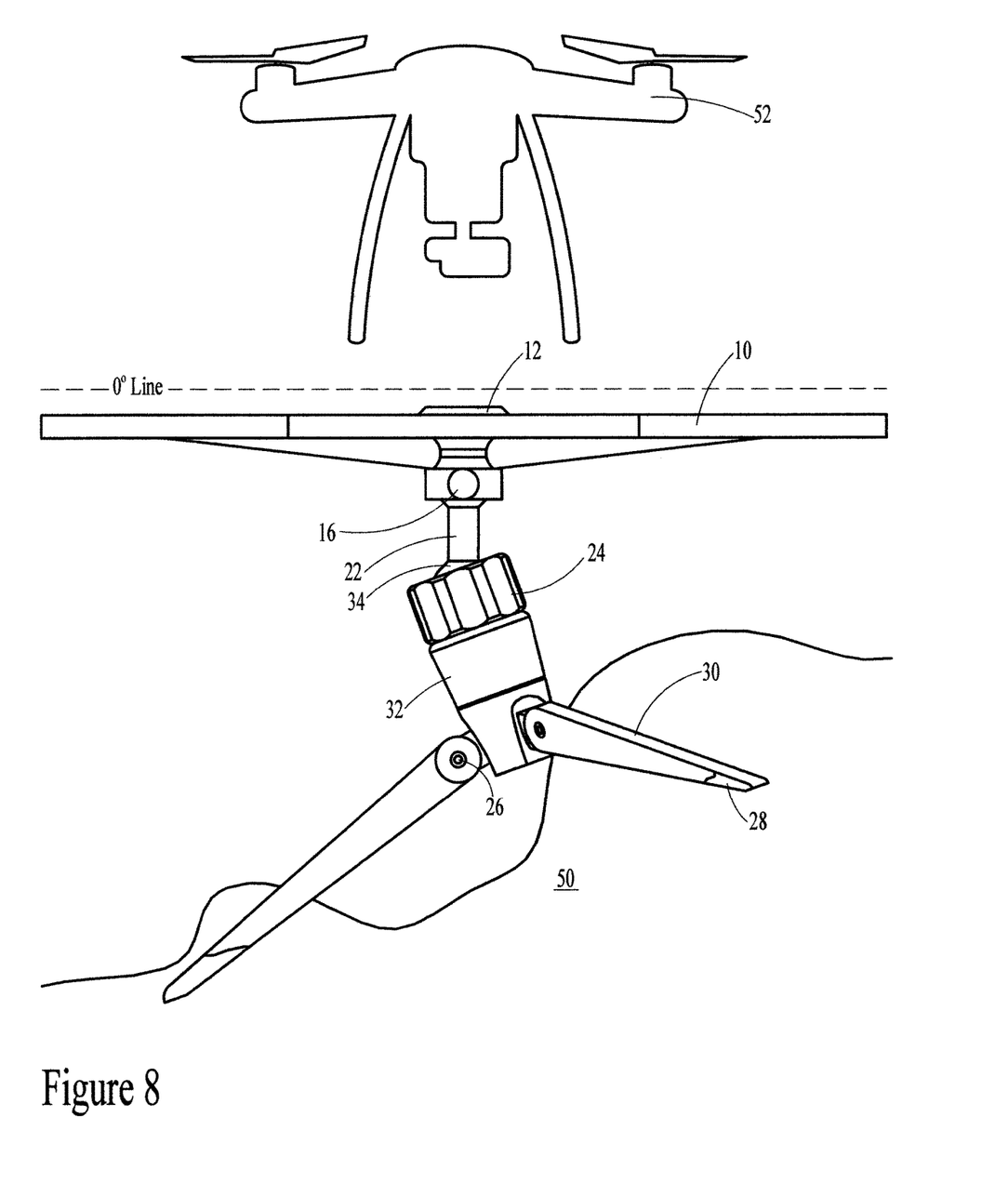
FIG. 8 illustrates a side view of the preferred embodiment of the present disclosure in use.

To prepare the platform for use, the legs 30 of the stand 14 are unfolded manually and locked into the fully deployed position. The platform dovetail 20 is placed into the dovetail connection 18 at the top of the shaft of stand 14 and the tightening screw 16 is tightened until the platform is secured to the stand. The stand is placed onto the surface. For example, FIG. 8 illustrates surface 50 that may be uneven. Rubber feet 28 allow the legs 30 to grip the surface that may be uneven. Now, the platform 10 is manipulated until the level 12 shows that the platform is horizontally level and vertically plumb. A bull's eye level is a type of spirit level that allows for the leveling of planes in two dimensions— both the 'pitch' and 'roll' in aeronautical terms. Once platform 10 is level, the tightening collar 24 is turned counter-clockwise constraining swivel ball 34 connected to shaft 22 which in turn is connected to slot 18, dovetail 20, and platform 10. This prevents the free rotation of the ball joint assembly (22/34) in the horizontal and vertical axes. As shown in FIG. 8, the platform 10 is now in position to provide a level surface for landing and launching drone 52.

Various alternate embodiments of the device may incorporate improved features including, but not limited to, scalability to a variety of sizes, the incorporation of interchangeable skins adapted for placement on the landing surface, the incorporation of motors and gears for automated adjustment, and LED lighting elements. For example, skin 45 having a grid pattern thereon could be fitted over the top surface of platform 10, as shown in FIG. 6. Skins having any other pattern thereon could be substituted. Alternatively, the top surface of the platform itself could be printed with a design such as the grid 45 or any other design.

In order to accommodate larger drones, extension plates could be incorporated into the platform. FIG. 9A illustrates a circular platform 10 having, preferably, four extension plates 46. As shown in FIGS. 9B and 9C, each extension plate 46 has preferably two holes 47 on its inner edge. The base pad 48 has matching holes 49 into which are placed 8-mm pins, for example, to connect the extension plate 46 to base pad 48. There could be three extension plates or more than four extension plates so long as the total number of extension plates serves to extend the diameter of the entire base pad, as shown in FIG. 9A. The base pad could be circular as shown in FIG. 9A, or it could be octagonal as shown in FIG. 1, or other shapes. FIGS. 9A-9C are all views showing the bottom surfaces of the base pad and extension plates.

The platform device of the present disclosure adapts to any terrain and can achieve a level position necessary for safe launch and recovery operations, or to achieve precise drone IMU system calibration. The device is compact, transportable, and has a built-in leveling gauge. It provides stability and protection against rocky, dirty, or uneven terrains.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:

1. A portable platform device comprising:
   a platform having a flat top surface configured for launching and landing a drone thereon, configured to be fixed to a stand and configured to be adjustable to a horizontally level and vertically plumb position; and
   a gauge affixed to said flat top surface, said gauge configured to measure said horizontally level and said vertically plumb positions,
   wherein said platform comprises a base pad having holes spaced around its outside edge and a plurality of extension plates, each extension plate having holes spaced on its inside edge, wherein pins join each hole on said extension plates to a corresponding hole on said base pad along said outside edge of said base pad, thereby increasing a diameter of said platform.

2. The device according to claim 1 wherein said gauge comprises a spirit or bubble level.

3. The device according to claim 1 wherein said stand comprises a tightening knob wherein said tightening knob is configured to lock said platform into said horizontally level and vertically plumb position and is configured to be loosened to change orientation of said platform.

4. The device according to claim 1 wherein:
   said base pad is circular and has eight holes radially spaced around its outside edge; and
   said plurality of extension plates comprises four of said extension plates, each extension plate having two holes spaced on its inside edge.

5. The device according to claim 1 wherein said platform is circular.

6. The device according to claim 1 wherein said platform is octagonal.

7. A process for providing a launch and recovery platform for drones that is adjustable and can be calibrated to a position of zero degrees, comprising:
   providing a portable platform device comprising:

a platform having a flat top surface configured for launching and landing a drone thereon and a gauge affixed to said flat top surface, said gauge configured to measure level and plumb positions, said platform configured to be fixed to a stand and configured to be adjustable to a horizontally level and vertically plumb position, wherein said platform comprises a base pad having holes spaced around its outside edge and a plurality of extension plates, each extension plate having holes spaced on its inside edge, wherein pins join each hole on said extension plates to a corresponding hole on said base pad along said outside edge of said base pad thereby increasing a diameter of said platform;

affixing said platform to said stand;

manipulating said platform until said gauge indicates said horizontally level and vertically plumb position;

thereafter tightening a tightening knob on said stand to lock said platform into said horizontally level and vertically plumb position.

8. The device according to claim 1 further comprising a skin configured to be fitted over a top surface of said platform wherein said skin has pattern thereon.

9. The device according to claim 1 further comprising a design printed on a top surface of said platform.

* * * * *